Oct. 22, 1929.  M. SPROCKHOFF  1,732,386
SEPARATOR
Filed Aug. 6, 1927  2 Sheets-Sheet 1
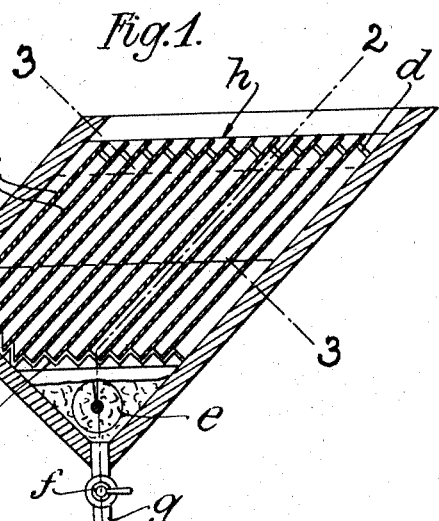
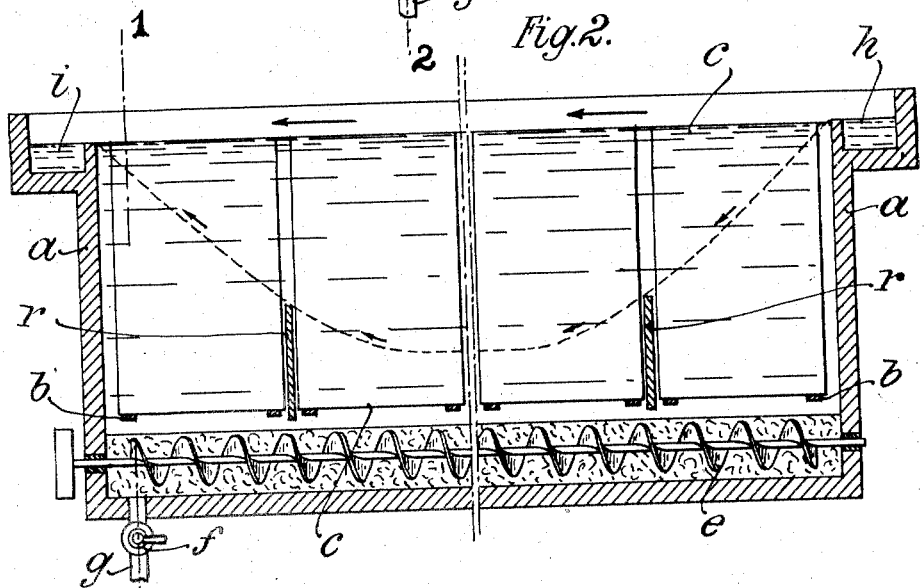
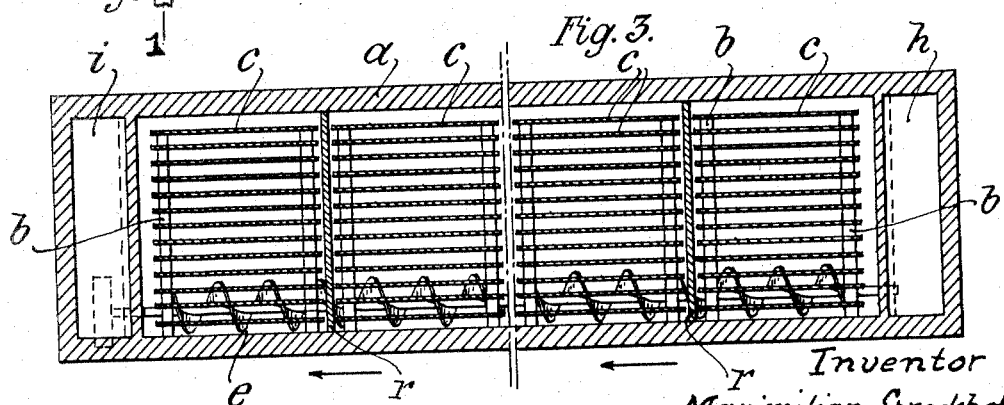
Inventor
Maximilian Sprockhoff
by
Attorney

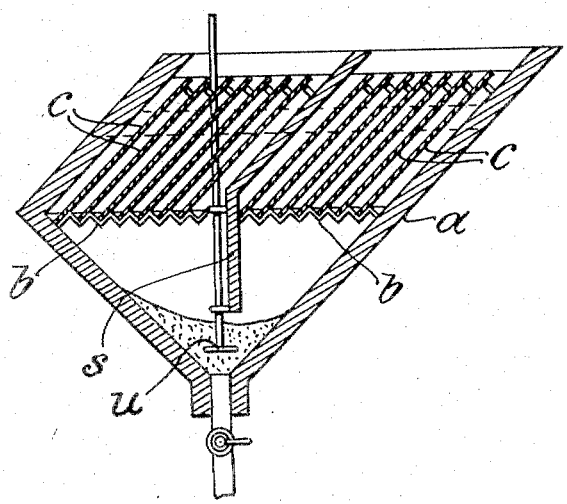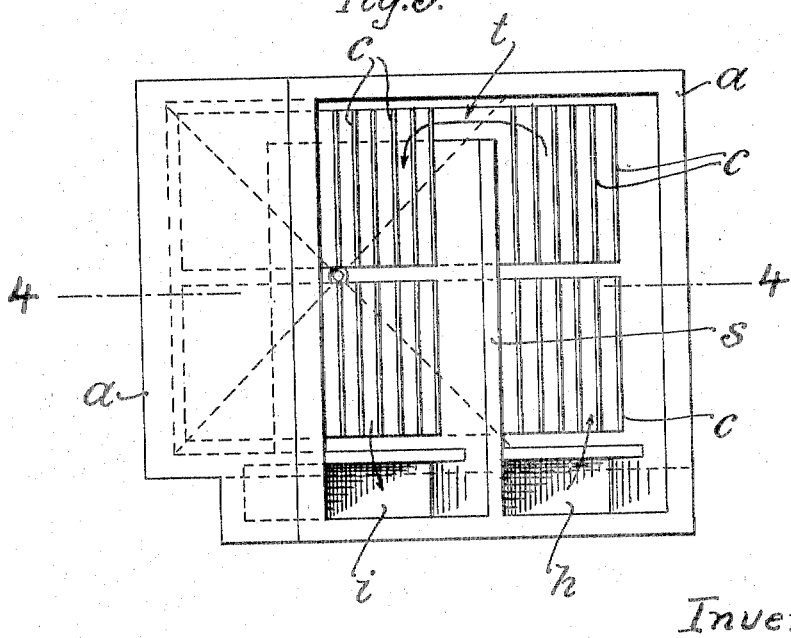

Patented Oct. 22, 1929

1,732,386

UNITED STATES PATENT OFFICE

MAXIMILIAN SPROCKHOFF, OF ST. GEORGEN, NEAR FREIBURG, GERMANY

SEPARATOR

Application filed August 6, 1927, Serial No. 211,137, and in Germany August 9, 1926.

The present invention has reference to improvements in clarifying and settling tanks and relates more particularly to tanks of this general character for clarifying, parting, and settling fluids in which, according to this invention, the settling chamber proper is subdivided by obliquely extending parallel baffle or settling plates into a plurality of cells through which the liquid to be cleared is passed by means of an overflow arrangement, and the particular object of the invention is to so arrange the baffle plates that the products of separation running off the lower edges of the plates are discharged for settling to the bottom of the tank without coming again within the domain of, and thus being entrained upwardly by, the liquid under treatment which is constantly agitated and kept in flow by the continuous inflow of fresh liquid.

According to my invention this improvement is obtained by mounting the parallel oblique settling plates in the settling chamber in such manner that their lower discharge edges extend below the body of moving liquid under treatment, with the result that the separated-out products running off the lower edges of the plates can unimpededly settle to the bottom of the tank. A further improvement in this tank construction is the provision of cross-partitions between the individual settling plates, arranged cross-wise of the flow of the liquid at the settling and running-off zone, so that in this portion of the tank a disturbing movement of the liquid is effectively prevented.

My invention will readily be understood from a detailed description in connection with the accompanying drawings, in which Fig. 1 is a vertical section on line 1—1 of Fig. 2; which latter is a longitudinal section on line 2—2 of Fig. 1. Fig. 3 is an oblique section on line 3—3 of Fig. 1. Fig. 4 is a vertical section on line 4—4 of Fig. 5, which latter figure is a top view of a modification.

The tank or vat $a$ of reinforced concrete, wood or other suitable material is subdivided into a relatively large number of bottomless cells by obliquely arranged parallel plates $c$ of metal, wood, glass, or the like, resting on cross supports $b$. These plates $c$ may extend the entire length of the tank, or they may be arranged in groups or sets, four of which sets are shown by way of example, spacedly mounted in alinement. The angle at which these plates extend may vary and is determined by the sliding coefficient of the material treated.

Preferably the respective tank walls are given the same slope or slant as the contained plates $c$, as shown in Fig. 1. The grouped plates at their lower ends are spacedly held in place by the serrated cross-supports $b$. At the top the plates are interspaced by the distance members $d$ or other suitable means. The settling plates may have a smooth settling surface, or they may be roughened, buckled, or corrugated or otherwise deformed, as some substances will settle better on uneven surfaces.

Between the several plate groups in the lower part of the tank are provided lower partition walls or baffle plates $r$, extending cross-wise of the direction of flow of the passing liquid, for preventing disturbing flow of the liquid at this zone, which would interfere with the proper undisturbed discharge of the sediment from off the settling plates.

In the lower contracted portion of the tank is provided a conveyer $e$ for moving the solids or the pulpous concentrate through an adjustable cut-off $f$, for instance a valve or slide, to an adjustable discharge $g$. As shown in Fig. 2, this conveyor arrangement extends horizontally, but it may also, obviously, be slantingly arranged to aid in the discharge movement of the concentrate.

If the tank is relatively small, all four walls thereof may be taperingly brought together at the bottom so that the concentrate will settle at the lowest point thereof for ready discharge therefrom without any special conveying means.

The liquid to be treated enters the tank from the side trough $h$ and leaves by the opposite trough $i$, and in its passage through the tank flows through the interspaces between the settling plates. The lowermost boundary of the liquid kept in motion by the constant flow of fresh liquid is indicated by the arrowed dash-line in Fig. 2. Thus, at the places where the settling substances slip off the plates c, that is their lower edges, there is no flow movement of the liquid so that the settling substances can unimpededly sink to the tank bottom without danger of being entrained by the flowing liquid, which makes for a greatly improved clarifying action over the prior art, where the settling particles were always subjected more or less to the disturbing action of the moving liquid.

In the modification shown in Figs. 4 and 5, the arrangement of the settling plates c is shown in connection with a tank of square cross-section, the tank a being centrally subdivided into two chambers by a partition wall s which does not extend quite down to the tank bottom and leaves at one side a passage t (Fig. 5) for the liquid, for the purpose of reversing the flow of the liquid in the second chamber relative to that in the first chamber. The inflow and outflow troughs h' and i' respectively in this instance are separately arranged on the same tank wall. This arrangement permits of taperingly running the walls of the tank together into a bottom funnel for discharge of the sediment. A simple agitator u operated from above serves for stirring the sediment.

As in the case of single suspensions, a similarly favorable operation is had in separating two suspensions of different specific weights, each of which by itself is rather difficult to part, for instance in the manufacture of starch in the separation of thick, impure, stringy starch milk, which can readily be separated into a suspension of pure starch, and a fibrous suspension. In the same manner two liquids of different specific weights can readily be separated in my improved separator.

What I claim is:—

1. In a separator of the character set forth, the combination with a liquid containing tank, of a plurality of parallel settling plates extending obliquely in said tank laterally of the line of flow of the liquid and immersed in the liquid therein, and means for causing liquid to flow continuously through said tank in such manner as to cause portions of the plates above a certain level to be immersed in flowing liquid and portions of the plates below said level to be immersed in relatively still liquid and at least the portions of the plates immersed in the relatively still liquid being imperforate for the purpose of allowing settling substances to slide off the latter-named portions of the plates and settle in the bottom of the tank without disturbance from flowing liquid.

2. In a separator according to claim 1, the arrangement of the settling plates in groups and the provision of cross-partitions between groups of said settling plates, arranged crosswise of the flow movement of the liquid and extending from the tank bottom below the lower zone of flow of the liquid upwardly into the lower zone of flow of the liquid, to prevent the latter from coming into wiping contact with the lower portion of said plates.

3. In a separator of the character set forth, the combination with a liquid containing tank, of a plurality of parallel settling plates arranged obliquely laterally in said tank in the direction of the line of flow of the liquid and immersed in the liquid therein, the walls of said tank having a slope corresponding to the slope of the plates, and means for causing liquid to flow continuously through said tank in such manner as to cause portions of the plates above a certain level to be immersed in flowing liquid and portions of the plates below said level to be immersed in relatively still liquid and at least the portions of the plates immersed in the relatively still liquid being imperforate for coaction with said means to allow settling substances to slide off the latter-named portions of the plates and settle in the bottom of the tank without disturbance from flowing liquid.

In testimony whereof I affix my signature.

MAXIMILIAN SPROCKHOFF.